(No Model.)
H. LENFANT.
MANUFACTURE OF BLANKS FOR EYEGLASSES.
No. 374,546. Patented Dec. 6, 1887.
FIG. I.
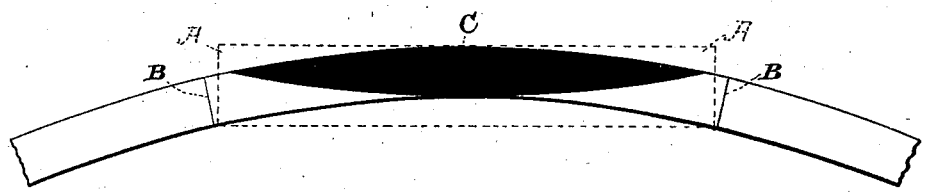
FIG. II.
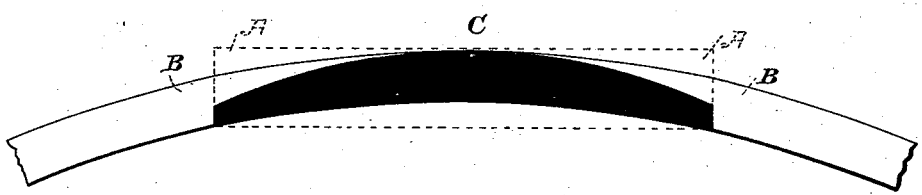
Attest:
Geo. T. Smallwood,
Philip Mauro
Inventor:
Henri Lenfant
By A. Pollok
his attorney.

UNITED STATES PATENT OFFICE.

HENRI LENFANT, OF NOGENT-SUR-MARNE, SEINE, FRANCE.

MANUFACTURE OF BLANKS FOR EYEGLASSES.

SPECIFICATION forming part of Letters Patent No. 374,546, dated December 6, 1887.

Application filed October 6, 1887. Serial No. 251,658. (No model.) Patented in France June 15, 1886, No. 176,769.

*To all whom it may concern:*

Be it known that I, HENRI LENFANT, of Nogent-sur-Marne, Department of the Seine, France, have invented a new and useful Improvement in the Manufacture of Blanks for Eyeglasses and other Lenses, of which the following specification is a full, clear, and exact description, the said invention having been patented to me in France by Patent No. 176,769, dated June 15, 1886.

This invention has reference to the manufacture of the blanks to be subsequently used by the optician for the manufacture of eyeglasses for spectacles, and for like purposes.

Heretofore the practice in the manufacture of such blanks has been to blow the glass in the form of a hollow cylinder, which, being brought to the proper thickness, is slit along a generatrix, softened by reheating, and then developed into a rectangular sheet. The sheet is then cut and trimmed to the approximate shape of the eyeglass.

Such blanks constitute articles of manufacture and commerce, the cutting and grinding into the eyeglass or lens being a separate industry.

In constructing lenses from these flat blanks it is necessary, generally, to grind both surfaces of the blank, causing a great waste of glass and of the grinding material and necessitating a considerable expenditure of skilled labor.

The object of my invention is to form the blank in such manner as to facilitate the labor of the optician and save much of the waste referred to. To this end the glass is blown (preferably in a mold) into the form of a cylinder, polyhedron, sphere, or other hollow body having one or both surfaces curved, and then, without reheating and developing into a plane surface, is cut into blanks, so that the finished blanks have one or both surfaces curved. The form of the mold may be varied, and the faces of the sides may have curvatures more or less pronounced.

The blanks may be made from spheres of different diameter, to give the glasses the definite number of foci desired, so that they may have in the blank a curvature that renders cutting or grinding unnecessary.

The process is also applicable to the manufacture of cylindrical glasses, substituting for the flat sheet polyhedrons having faces composed of sections of cylinders of varying curvature, and which have a certain relation to the number of foci designed to be obtained.

This improvement saves material and labor in the production of the lens, and saves, moreover, the steps of reheating and development in the manufacture of the blanks, which is a very important economy.

In order that the invention and the manner of carrying the same into effect may be fully understood by those skilled in the art to which it relates, the following description is given, reference being had to the accompanying drawings, which illustrate, by way of example, an old and new form of blank and a lens to be made therefrom, both the figures being views in cross-section.

The lens shown in Figure I is of the ordinary biconvex form. That shown in Fig. II is of the form known as "meniscus."

The rectangle A A represents the ordinary flat blank, from which the lenses C (represented in solid black) are to be produced.

It clearly appears from the drawings that in forming the lens C from the blank A both surfaces of the latter have to be ground, involving a great expenditure of labor and wastage of material.

B represents a curved blank made in accordance with the invention. As shown, the blanks B are in both figures sections of hollow spheres, this form being illustrated merely by way of example. In Fig. I the curve of the exterior surface of the blank B coincides with that of the lens C. In Fig. II the inner surface of the blank B is utilized as one of the surfaces of the finished lens.

It will be seen that the use of the new curved blank effects considerable saving in material and in costly skilled labor in the formation of the lenses, and also renders unnecessary the steps of reheating and developing into a plane surface.

Another important advantage of the invention is, that it results in the production of purer and better glass, since flaws are often formed in the process of developing the glass upon plates as ordinarily practiced.

It will of course be understood that the finishing of the lens by cutting and grinding—in other words, the work of the optician—forms no part of my invention, which relates solely to the improved mode of forming the blank and to the improved blank itself as an article of manufacture, and not to lenses or finished glasses for optical purposes, which constitute a separate and distinct commodity in manufacture and commerce.

I claim—

As a new manufacture, a blank for the production of eyeglasses or other lenses, said blank having one or both surfaces curved, substantially as described.

In testimony whereof I have signed this specification in the presence of two subscribing witnesses.

HENRI LENFANT.

Witnesses:
JULES FAYOLLE,
AUG. VINCK.